United States Patent [19]
Koch et al.

[11] 3,988,170
[45] Oct. 26, 1976

[54] BATTERY CASES

[75] Inventors: Kjell H. M. Koch, Kungalv; Rune Schmechtig, Nol, both of Sweden

[73] Assignee: Aktiebolaget Tudor, Sundyberg, Sweden

[22] Filed: June 30, 1975

[21] Appl. No.: 591,654

[52] U.S. Cl. .............................. 429/163; 220/23.4; 220/69
[51] Int. Cl.² ........................................ H01M 2/02
[58] Field of Search ............ 136/166, 171; 206/333, 206/495; 220/17.1, 23.4, 69

[56] References Cited
UNITED STATES PATENTS

| | | | |
|---|---|---|---|
| 672,219 | 4/1901 | Stevens | 136/166 |
| 2,094,329 | 9/1937 | Mascuch | 136/166 |
| 2,933,548 | 4/1960 | Walker | 136/171 |
| 3,623,917 | 11/1971 | Chassoux | 136/171 |

FOREIGN PATENTS OR APPLICATIONS 1,368,075  12/1964  France ................................ 136/166

*Primary Examiner*—Donald L. Walton
*Attorney, Agent, or Firm*—Burns, Doane, Swecker & Mathis

[57] ABSTRACT

An electric storage battery is provided with a casing having side walls with extensions projecting below the bottom wall. The extensions are formed to have a shape that cooperates with members on a battery support for attachment thereto so that one or more batteries can be installed on the support with a minimum of difficulty and yet be anchored in place to avoid being overturned. The mount is particularly useful in mobile vehicles or boats.

12 Claims, 8 Drawing Figures

BATTERY CASES

BACKGROUND OF THE INVENTION

This invention relates to cases for electric storage batteries which are to be fixed on their installation site. The sites may be either stationary or mobile, located, for example, in a building or in a vehicle or boat.

Electric storage batteries are often required to be fixed onto their installation sites. The reason for this is, of course, that the storage battery might be exposed to forces which could cause it to move out of position. For example, the storage battery might be overturned and the electrolyte run out, or the storage battery might be damaged with various undesirable consequences. To minimize this risk the storage battery should be fixed in some way onto its installation site.

Suitable fixing arrangements will vary of course, depending on the forces to which the storage battery will be exposed. Various methods of solving this problem have already been proposed; for example, a belt or other arrangement may be stretched over the storage battery and connected to the substructure. Batteries for automobiles have been provided with "facings" or heel straps, by which the lower part of the battery is secured to the automobile frame. Another alternative is that folds or lugs may be made in the battery case for connection to the substructure. All these constructions involve disadvantages such as, for example, poor strength properties, high weight or large space requirements.

In a preferred form, the present invention provides a battery case which comprises side wall members and a bottom member, the said side wall members having extensions which extend below the bottom member of the case and which are adapted to be fixed to a substructure or support member.

It is accordingly an object of the present invention to provide a novel storage battery case which permits the battery to be more readily installed at its operation site with less danger of being subjected to detrimental movement.

Another object of the invention is to provide a novel storage battery casing wherein extensions of the walls below the bottom wall provide means for anchoring the battery at its operation site with reduced danger of it being subjected to overturning.

It is a further object of the invention to provide a novel installation of, and method of installing, storage battery casings which permit convenient assembly of a plurality of batteries together at their operation site.

Still another object of the invention is to provide improved storage batteries with cases using a construction employing reinforcing fibers in enlarged lower surface supports to provide added strength and permit easy anchoring to a supporting surface.

These and other objects and advantages of the invention will be apparent from the claims and from the following detailed description when read in conjunction with the appended drawings, in which:

Figure 1:
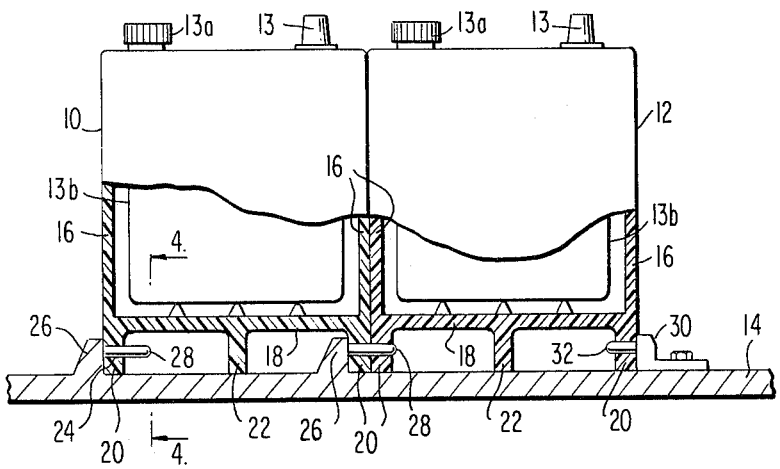
FIG. 1 is a view partly in cross section of two storage batteries with cases in accordance with the invention installed in operating position on a support member.

In FIG. 1, two storage batteries in cases 10 and 12, having usual terminals 13, filler opening caps 13a and plates 13b, are shown installed together on a support member 14. The side walls of the cases are designated by reference numeral 16 and the bottoms of the cases by reference numeral 18. The side walls have downwardly projecting portions or extensions designated by the reference numeral 20 and a support rib in the bottom is designated 22. As shown in FIG. 1, for example, these downwardly projecting portions 20 are continuations of and in substantial alignment with the other surfaces of the side walls themselves. By making the walls 16 in one piece with the extensions 20, forces directed in the battery wall are distributed over the whole battery wall. In order to obtain external reinforcement, the bottom plate or wall 18 may have downwardly extending edges corresponding to the lower part of the battery wall. As shown, the extensions 20 are thicker than the side walls. In this way external strengthening of the walls is achieved, which strengthening may be important in the event of the whole battery having to stand on these edges.

Figure 2:
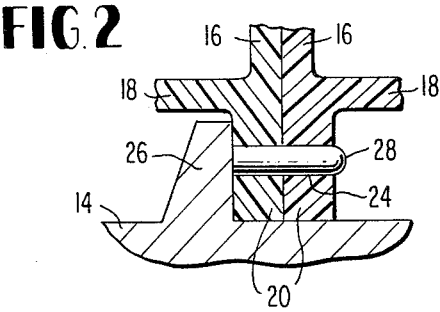
FIG. 2 is a sectional view to an enlarged scale of one arrangement used in FIG. 1 for fastening the batteries to a support member.
Figure 4:
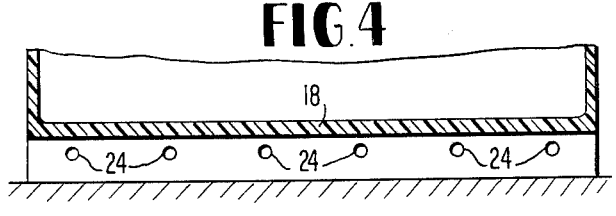
FIG. 4 is a partial sectional view taken along the line 4—4 of FIG. 1.

Extensions 20 in FIG. 1 have space holes 24 therein as also shown in FIG. 4. Two groups of attaching members 26, shown also in FIG. 2 project from support member 14. These attaching members 26 include pins 28. The pins 28 of one group of attaching members extend into the openings 24 in the extension 20 of the left side wall of battery 10. The pins 28 of the other group of attaching members extend into the openings in both of the adjoining extensions of the adjacent side walls of batteries 10 and 12 as shown in the enlarged view of FIG. 2.

Figure 3:
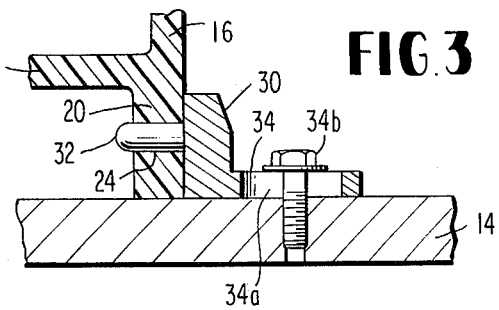
FIG. 3 is a sectional view to an enlarged scale of another fastening arrangement used in connection with FIG. 1.

Modified attaching members 30 are shown engaging the extension 20 of the right hand side wall 16 of battery 12 in FIG. 1. The enlarged view of FIG. 3 shows each member 30 as having an upright portion carrying a pin 32 extending into the hole 24 of the extension 20. Member 30 is mounted so as to be moved into an adjustable position on the support member 14 in any suitable manner. For example, arm 34 of member 30 may include a narrow slot 34a which receives bolt 34b threaded into support member 14 to allow removal of pin 32 from the hole 24 in the battery casing wall.

In providing the assembly of FIG. 1, battery 10 may be placed on the support member 14 and slidingly moved to bring the pins 28 on the two groups attaching members 26 into the holes 24 in the extensions 20 on opposed side walls. Battery 12 may then be moved into position adjacent battery 10 with the extension on its left side wall receiving pins 28 of the intermediate group of attaching members 26. Thereafter, attaching members 34 are adjusted into positions with their pins 32 in holes 14 and fixed in place by tightening bolts 34b.

While FIG. 1 represents an arrangement where holes for attaching means are required only in the extensions 20 of two opposed side walls of a battery, it is possible to attach a battery or batteries to a support member by means of holes in extensions provided on three or four sides. Various combinations of fixed attaching members 26 and adjustable attaching members 30 for doing this will be apparent from the foregoing description.

Figure 5:
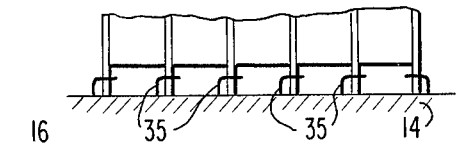
FIG. 5 is a diagrammatic view representing five batteries fastened adjacent to one another on a support in accordance with the invention.

A number of cells aligned side by side in a row may be anchored at their bottom surface as shown in FIG. 5, wherein all of the attaching means 35 are positioned beforehand on the support member 14. By this construction, it is apparent that side-wise tipping of the battery casings is effectively prevented. Any side-wise directed force will be spread across the entire surface area of the abutting side walls.

Figure 6:
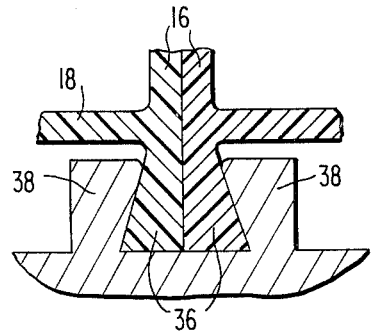
FIG. 6 is a partial sectional view of a modified form of the side wall extension and attaching means of the invention.
Figure 7:
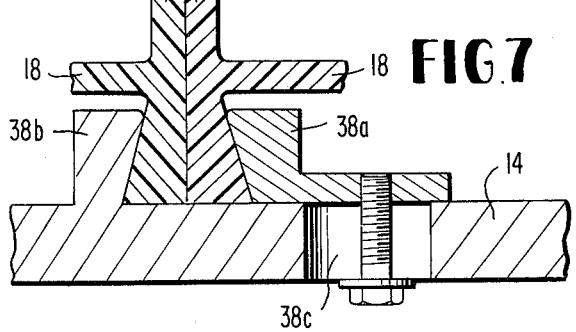
FIG. 7 is a sectional view showing a modification of the arrangement of FIG. 6.

FIG. 6 illustrates an embodiment in which the extensions of the side walls are designed in wedge-like form. In this Figure, the extension 16 of the battery wall is constructed with its outer side parallel to the battery wall but with its inner side at an angle to the battery wall in such a way that the cross-sectional dimension of the extension increases in relation to that of the cell wall as shown at 36. In this way the cell may be gripped fast by complementary shaped surfaces on attaching elements 38 on the support member 14. The battery may be fixed in position by sliding it in from the side. FIG. 7 shows an adjustable attaching member portion 38a secured to the support member by a bolt and slot arrangement. The arrangement is similar to that of FIG. 3 but the slot 38c is in the base 14. Where the outside wall of the last battery in a row is to be engaged, that wall may have holes on its extension and the arrangement 30 of FIG. 3 may be employed. Without the holes in the last wall, such wall may be engaged by a member similar to 30 without the pins 32. Such adjustable portions may be employed in conjunction with a fixed portion 38b or another adjustable portion as the occasion requires. They are particularly useful where all four sides of a rectangular casing are to be attached to the support member.

The construction in accordance with the invention is particularly advantageous when the battery case is constructed from a reinforced plastics material. For the battery cases used in this connection, it is preferable for self-hardening polyester plastics materials to be reinforced with woven fabric, for example, glass fiber or polyester. With such a construction particularly good provision is made for the case to be able to take up any stresses which might occur over a wide area, for example, upon sudden acceleration. The reinforcing fabric is desirably formed as one piece extending for the whole height of the case. It is also possible that by inlaying fibers with particularly good tensile strength properties, such as carbon fibers, for example in the lower part of the case, additional reinforcement of the case is obtained.

Figure 8:
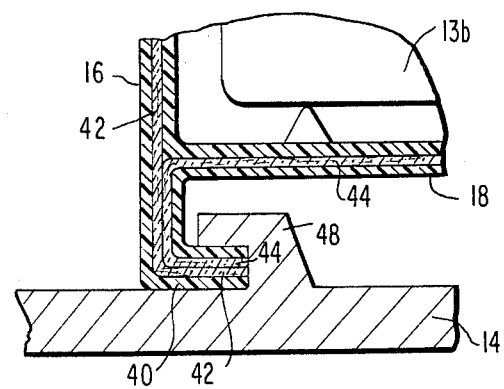
FIG. 8 is a partial sectional view of yet another embodiment of the invention.

It has also been found desirable with the extended reinforcement in one piece with the battery case, for the side walls 16 to be bent at an angle of 90° to form a fold or hook portion 40. Such a construction is shown at 40 in FIG. 8 and may be below the bottom wall 18 of the case or at approximately the same level as the wall. The reinforcing woven fabric 42 is shown as a mat having parallel vertical and horizontal fibers in the side walls of the battery casing which encloses the plate groups 13b that are traditionally immersed in a liquid electrolyte. A similar reinforcing mat 44 is shown extending inside the base 18 and vertically downward into the portion 40. The fold may fit into a slot formed by ledge 48 or the like arrangement that extends upwardly from the support member 14. It is possible to utilize reinforcing material from both the walls of the case as illustrated or from the bottom of the case or from both if desired.

The present embodiments are therefore to be considered in all respects as illustrative and not restrictive, the scope of the invention being indicated by the appended claims rather than by the foregoing description. For example, each battery case may embrace one or more cells as desired. All changes which come within the meaning and range of equivalency of the claims are therefore intended to be embraced therein.

What is claimed and desired to be secured by Letters Patent is:

1. A storage battery cell case for attachment to an underlying support structure, said case having at least one pair of opposing side wall members and a bottom member attached to said side wall members, said pair of opposed side wall members having portions which extend below the lower surface of the bottom member of the case for supporting the case, the outer surfaces of said portions being continuations of and in substantial alignment with the outer surfaces of said side wall members, said portions being shaped to be removably attached to cooperating portions of an underlying support structure.

2. A battery case as claimed in claim 1, wherein the extending portions of the said side wall members are provided with holes for receiving attaching pins.

3. A battery case as claimed in claim 1, wherein said side wall members have exterior planar surfaces and the extending portions of the said side wall members have a wedge-shaped cross-section with their outer surface being in alignment with the exterior surface of the side wall members, the cross-sectional width of the extending portions of the said walls increasing in a downward direction from the bottom member of the battery case.

4. A battery case as claimed in claim 1, wherein the extending portions of the side wall members on the bottom member are formed into inwardly bent hook-like extensions which are adapted to be secured to cooperating hook-like extensions on an underlying support structure.

5. In combination, a support member, a storage battery cell in a case having liquid electrolyte filler openings in a top wall, said battery further comprising opposed pairs of side wall members and a bottom member, at least one pair of opposed side wall members having portions which extend below the lower surface of the bottom member of the case, the outer surfaces of said portions being in substantial alignment with the outer surfaces of the side wall members, and said support member for cooperating with said portion that extends below the bottom member for releaseably attaching said battery cell case to said support member.

6. The combination as claimed in claim 5, wherein said lower extending portions are formed with at least two apertures and said support member means includes projecting pin means extending into the apertures in said lower extending portions.

7. The combination as claimed in claim 5, wherein said lower extending portions of adjoining side wall members of adjacent cases are shaped to provide a wedge-shaped configuration, and said means on said support member is shaped to provide a groove with surfaces engaging the wedge-shaped portions of said adjoining side wall members.

8. In combination, a support member, a plurality of storage battery cells in cases each including filling openings in top walls, each battery further comprising opposed pairs of side wall members and a bottom member, portions on at least one pair of opposed side wall members extending downwardly below the lower surface of said bottom members of the cases, the outer surfaces of said portions being in substantial alignment with the outer surfaces of their respective side wall members, and said support member for cooperating with the portions of the side wall members that extend below the bottom member for releaseably attaching said cases in side-by-side relationship on said support member with the adjoining outer surfaces of the extensions of adjacent cases in abutting engagement.

9. The combination as claimed in claim 8, wherein the means on said support member includes at locations where the side wall members of two cases that are in abutting engagement a single structure that engages the lower extending portions on the abutting adjacent case side wall members.

10. The combination as claimed in claim 9 wherein the means on the support member restrains the cases against vertical movement and against lateral movement in at least two directions.

11. A method of mounting, in anchored side-by-side relation on a supporting member, a plurality of storage batteries each of which comprises one or more cells in a case including a liquid electrolyte confined by side wall members, a bottom member, and portions extending downwardly below the lower surface of the bottom wall member, comprising:

placing a first case on said support member with a first side wall member moved in said first direction to a predetermined position on said support member and with the lower extending portion of the opposing wall in engagement with attaching means on said support member to restrain the battery against vertical movement and against lateral movement in a direction perpendicular lateral movement in a first direction; and placing each succeeding case on said support member with one side wall member in abutting engagement with the opposing side wall member of the last battery case previously placed on the supporting member with the lower extending portion on said one side wall member in engagement with the same attaching means engaging the lower extending portion on the opposing side wall member of the last case previously placed to restrain said one side wall member of each succeeding battery case against vertical movement and against lateral movement in a direction perpendicular to said first direction.

12. The method claimed in claim 11 further comprising locking the last of said plurality of cases on said supporting member by bringing means on said supporting member into abutting engagement with the opposing side wall member of the last of said plurality of cases to restrain said opposing side wall against lateral movement in a direction opposite said first direction.

* * * * *